US009594809B2

(12) United States Patent
Muth

(10) Patent No.: US 9,594,809 B2
(45) Date of Patent: *Mar. 14, 2017

(54) SYSTEM AND METHOD FOR COMPILING SEARCH RESULTS USING INFORMATION REGARDING LENGTH OF TIME USERS SPEND INTERACTING WITH INDIVIDUAL SEARCH RESULTS

(71) Applicant: Karl Muth, Chicago, IL (US)

(72) Inventor: Karl Muth, Chicago, IL (US)

( * ) Notice: Subject to any disclaimer, the term of this patent is extended or adjusted under 35 U.S.C. 154(b) by 1 day.

This patent is subject to a terminal disclaimer.

(21) Appl. No.: 15/045,100

(22) Filed: Feb. 16, 2016

(65) Prior Publication Data
US 2016/0162493 A1 Jun. 9, 2016

Related U.S. Application Data

(63) Continuation of application No. 12/695,727, filed on Jan. 28, 2010, now Pat. No. 9,262,526.

(51) Int. Cl.
*G06F 17/30* (2006.01)

(52) U.S. Cl.
CPC .... *G06F 17/3053* (2013.01); *G06F 17/30268* (2013.01); *G06F 17/30864* (2013.01); *G06F 17/30867* (2013.01)

(58) Field of Classification Search
None
See application file for complete search history.

(56) References Cited

U.S. PATENT DOCUMENTS

| | | | |
|---|---|---|---|
| 2006/0064411 A1* | 3/2006 | Gross | G06F 17/30864 |
| 2007/0005587 A1* | 1/2007 | Johnson | G06F 17/3053 |
| 2007/0276733 A1* | 11/2007 | Geshwind | G06Q 30/02 705/14.49 |
| 2007/0283409 A1* | 12/2007 | Golden | H04H 60/33 725/139 |
| 2009/0282022 A1* | 11/2009 | Bennett | G06F 17/30675 |
| 2010/0005403 A1* | 1/2010 | Rozmaryn | G06Q 30/02 715/760 |
| 2010/0287174 A1* | 11/2010 | Yang | G06F 17/30864 707/759 |

\* cited by examiner

*Primary Examiner* — Bai D. Vu
(74) *Attorney, Agent, or Firm* — Klaas, Law, O'Meara & Malkin; John Wiberg

(57) ABSTRACT

A system and method for producing more relevant search results. When a user selects a search result from a search result listing, the amount of time that the user spends interacting with the item associated with the search result is tracked. Such information regarding interaction time is compiled and is used as a factor in assessing relevance of items in future searches.

16 Claims, 8 Drawing Sheets

SYSTEM AND METHOD FOR COMPILING SEARCH RESULTS USING INFORMATION REGARDING LENGTH OF TIME USERS SPEND INTERACTING WITH INDIVIDUAL SEARCH RESULTS

PRIORITY CLAIM

This application is a continuation of U.S. patent application Ser. No. 12/695,727, filed Jan. 28, 2010, now U.S. Pat. No. 9,262,526, issued on Feb. 16, 2016, the entire contents of which are hereby incorporated herein by reference.

FIELD OF THE INVENTION

The present invention relates generally to search engines, and more particularly to methods and systems for providing more relevant search results.

BACKGROUND OF THE INVENTION

Due to advances in computer technology and its increase in popularity, large numbers of people have recently started to frequently search huge databases. For example, internet search engines are frequently used to search the entire World Wide Web. Information retrieval systems are traditionally judged by their precision and recall. What is often neglected, however, is the quality of the results produced by these search engines. Large databases of documents such as the web contain many low quality documents. As a result, searches typically return hundreds of irrelevant or unwanted documents which camouflage the few relevant ones. In order to improve the selectivity of the results, common techniques allow the user to constrain the scope of the search to a specified subset of the database, or to provide additional search terms. These techniques are most effective in cases where the database is homogeneous and already classified into subsets, or in cases where the user is searching for well known and specific information. In other cases, however, these techniques are often not effective because each constraint introduced by the user increases the chances that the desired information will be inadvertently eliminated from the search results.

Search engines presently use various techniques that attempt to present more relevant documents. Typically, documents are ranked according to variations of a standard vector space model. These variations could include (a) how recently the document was updated, and/or (b) how close the search terms are to the beginning of the document. Although this strategy provides search results that are better than with no ranking at all, the results still have relatively low quality. Moreover, when searching the highly competitive web, this measure of relevancy is vulnerable to "spamming" techniques that authors can use to artificially inflate their document's relevance in order to draw attention to it or its advertisements. For this reason search results often contain commercial appeals that should not be considered a match to the query. Although search engines are designed to avoid such ruses, poorly conceived mechanisms can result in disappointing failures to retrieve desired information.

Some search engines use backlink information (i.e., information from pages that contain links to the current page) to assist in identifying relevant web documents. Rather than using the content of a document to determine relevance, the technique uses the anchor text of links to the document to characterize the relevance of a document. In particular, search query terms are compared to a collection of anchor text descriptions that point to the page, rather than to a keyword index of the page content. A rank is then assigned to a document based on the degree to which the search terms match the anchor descriptions in its backlink documents.

Another method of determining the importance of a document is citation counting, whereby the importance of a document is determined by counting its number of citations, or backlinks. The citation rank $r(A)$ of a document that has n backlink pages is simply $r(A)=n$. U.S. Pat. No. 6,285,999 describes a scheme based on citation counting and further refines the citation counting scheme. Instead of simply counting the number of citations to a given document, the U.S. Pat. No. 6,285,999 also assigns a weight to each citation, indicative of the relative importance of each citation. In this scheme, the importance of a page, and hence the rank assigned to it, depends not just on the number of citations it has, but on the importance of the citing documents as well. The U.S. Pat. No. 6,285,999 therefore describes an iterative scheme whereby the importance ranking of documents is calculated based on the number of other documents that cite to each document and the importance ranking of said citing documents. The importance rankings so calculated are then used in the next iteration of importance rating calculations, and so on. This scheme is sometimes referred to as a page rank scheme.

No search engine currently uses the amount of time a user spends on a given page in its calculation of relevance, page value, or link value. Further limitations and disadvantages of conventional and traditional approaches will become apparent to one of skill in the art through comparison of such systems with the present invention as set forth in the remainder of the present application with reference to the drawings.

BRIEF SUMMARY OF THE INVENTION

The present invention is directed generally to a computer-implemented method of processing search results generated by a search engine. Pursuant to said method, a length of time spent by a user on an item associated with a search result is determined, and a subsequent search result is processed based, at least in part, on said length of time. In an illustrative embodiment, said length of time is used in determining a search result ranking for a subsequent search.

In an illustrative embodiment of the invention, a length of time spent by a user on a web page associated with a search result is determined, and a subsequent search result is processed based at least in part on said length of time. In an illustrative embodiment, said length of time is used in determining a search result ranking for a subsequent search.

Another embodiment of the invention is directed to a computer-implemented method of processing a search result generated by an automated search for media files. Pursuant to said method, a length of time spent by a user experiencing (e.g., viewing, listening to, or otherwise interacting with) a media item associated with a search result is determined, and a subsequent search result is processed based at least in part on said length of time. In an illustrative embodiment, said length of time is used in determining a search result ranking for a subsequent search.

Another embodiment of the invention is directed to a computer-implemented method of processing a search result generated by an automated database search. Pursuant to said method, a length of time spent by a user on a database entry associated with a search result is determined, and a subsequent search result is processed based at least in part on said length of time. In an illustrative embodiment, said length of time is used in determining a search result ranking for a subsequent search.

It is to be understood that other embodiments of the present invention will become readily apparent to those skilled in the art from the following detailed description, wherein embodiments of the invention are shown and described only by way of illustration of the best modes contemplated for carrying out the invention. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

DETAILED DESCRIPTION OF THE INVENTION

Figure 1:
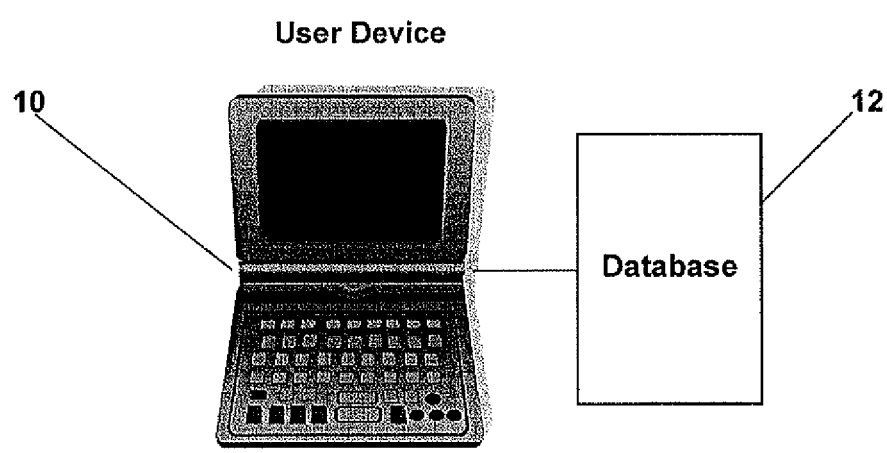
FIG. 1 is a schematic diagram representing a system in which the present invention can be implemented according to an illustrative embodiment of the invention.

The present invention relates to a method of providing more relevant search results. The invention involves the use of a temporal variable, namely the amount of time a user spends on an item to which he or she was referred by a search engine, as an indicator of that search result's relevance to subsequent users searching using the same or a similar input. The invention is applicable to any system in which a search for an item can be performed. For example, in an illustrative embodiment of the invention, the amount of time spent by a user on a database entry discovered by a search engine is used as an indicator of that entry's relevance. FIG. 1 is a schematic diagram representing a system in which the present invention can be implemented according to an illustrative embodiment of the invention. FIG. 1 shows a user 10 with access to an electronic database 12. In FIG. 1, the user is represented by a computer terminal, but in practice the present invention can be implemented with any device that can be used to access a database. Also, in FIG. 1, the database is shown as being separate from the access device. In practice, the database that is searched can be separate from the access device or can be stored on the access device. The database can also reside on a network and the user 10 can access the database via the network.

Figure 2:
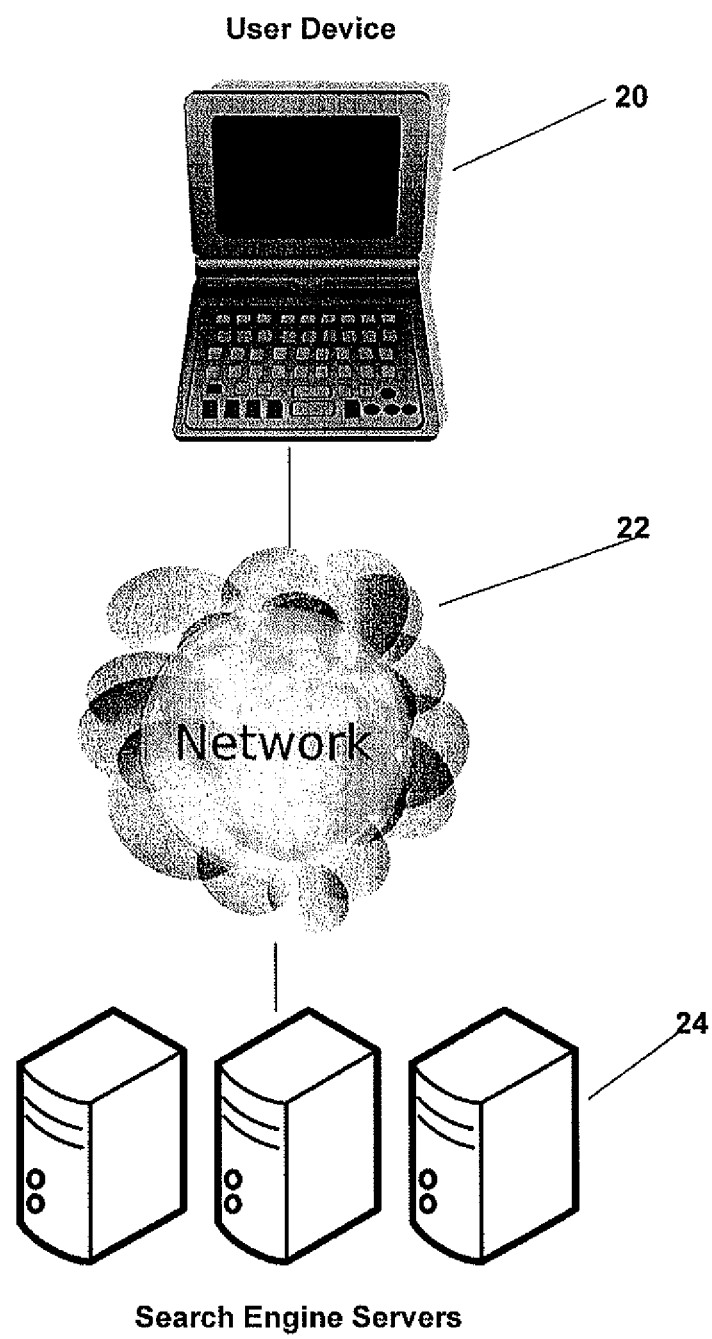
FIG. 2 is a schematic diagram representing a computer network in which the present invention can be implemented according to an illustrative embodiment of the invention.

In an illustrative embodiment, the method of the present invention is implemented in an Internet search engine. FIG. 2 is a schematic diagram representing a computer network in which the present invention can be implemented according to an illustrative embodiment of the invention. FIG. 2 shows a user 20 connected to a network 22. Also connected to network 20 are search engine servers 24. As in FIG. 1, the user is represented by a computer terminal, but in practice the present invention can be implemented with any device that can be used to access a computer network. In an illustrative embodiment of the present invention, the network 22 is the Internet, but the network 22 can be any type of network, including, but not limited to, a local area network (LAN), a wide area network (WAN), a wireless network, or a regional network. In an illustrative embodiment, the user 20 enters a search term or terms, sometimes referred to as a query, into a search engine user interface. The query is transmitted via the internet to the search engine servers 24. The search engine servers 24 illustratively include index servers that store an index of web pages that indicates which pages contain specific words. The search engine servers 24 also illustratively include document servers that store the full HTML code of every web page. The search engine servers 24 determine which web pages are the best match to the search terms entered by the user 20. This determination is made based on a plethora of factors, possibly including some of the factors discussed in the Background of the Invention section above. According to an illustrative embodiment of the present invention, the search engine servers maintain temporal information regarding how much time users spend viewing specific web pages after being directed to that web page by the search engine. This temporal information is then used as one factor in the determination of which web pages are the best match (most relevant) to the search terms entered by the user 20. Web pages that are viewed for longer periods of time after being directed there by the search engine, in response to the same or similar query, are ranked as being more relevant than web pages that are viewed for shorter periods of time. After making the determination regarding the relevance of search results, the search engine servers 24 transmit the search results to the user in the form of a search result list that ranks the search results in order of perceived relevance, with the most relevant result listed at the top of the list. The search result list is displayed on the screen of whatever device the user 20 is using to access the internet.

It might be noted that the embodiment of FIG. 2 is in some ways just a specific implementation of the embodiment shown in FIG. 1 in that the internet can be thought of as a database whose entries consist of web pages. Indeed the web pages of the Internet are literally entries in a database stored in the document servers of the search engine servers 24 of FIG. 2. For purposes of illustrating the concepts of the present invention, the invention will mostly be described in this specification with reference to an internet search engine. But it is to be understood that the inventive concepts discussed with respect to the internet search engine embodiment apply equally to other embodiments of the invention, such as embodiments pertaining to database searching wherein the amount of time that users spend interacting with database entries is used as a factor in the determination of which database entries are the best match (most relevant) to the search terms entered by a user.

In the Internet search engine embodiment of the present invention, when a user performs a search for a given search term, the search engine generates a list of search results deemed by the search engine to be most relevant to the query specified by the user. Each entry in the search result list typically includes a hyperlink to the associated web page. When the user clicks on a given hyperlink, the user is "taken to" the web page associated with that search result. That is, the web page associated with the search result is displayed on the screen of the device that the user is using to access the internet. At this point, the user will view the web page and decide if the content of that page is pertinent to what the user was looking for. If the content has little or nothing to do with what the user was searching for, the user will likely spend very little time viewing that page and will instead probably navigate away from that web page very quickly, perhaps navigating back to the search result list that was generated by his/her search. If, on the other hand, the user determines that the content on the web page associated with the search result is at least somewhat relevant to what he/she was looking for, the user is likely to spend more time viewing that web page to further assess the content. If the user then determines, after such further assessment, that the content, while somewhat relevant, is not exactly what he/she was looking for, the user again will likely navigate away from the web page upon making such a determination. However, if the user determines that the content of the web page is highly relevant to what he/she was looking for, the user is likely to spend a substantial amount of time viewing, or otherwise interacting with, the content on that web page. Thus, it can be seen that the amount of time that the user spends on a web page associated with a given search result is somewhat proportional to how "on point" the search result is, at least from the perspective of that user. The more pertinent the search result, the longer the user will spend on the associated web page. The present invention recognizes this dynamic and exploits it.

As discussed above, when a user views a web page to which he/she was referred by a search result, that user will spend a certain, measurable, length of time on that web page. According to an illustrative embodiment of the present invention, the search engine records that length of time for each web page view that results from viewing a search result. That is, every time a user clicks on a hyperlink contained in a search result, the search engine logs the amount of time that that user then spends on the associated web page. In this way, the search engine accumulates and maintains a database associating specific search terms, the search results (web pages) associated with those search terms, and information regarding how long users view each web page after being directed there by the search result. In an illustrative embodiment of the invention, this database is maintained in search engine servers such as the search engine servers 24 depicted in FIG. 2. Whenever a user performs a search, this temporal information is used by the search engine as a factor in determining what web pages are most relevant to the query submitted by the user, and in determining a ranking of the search results in order of relevance.

Figure 3:
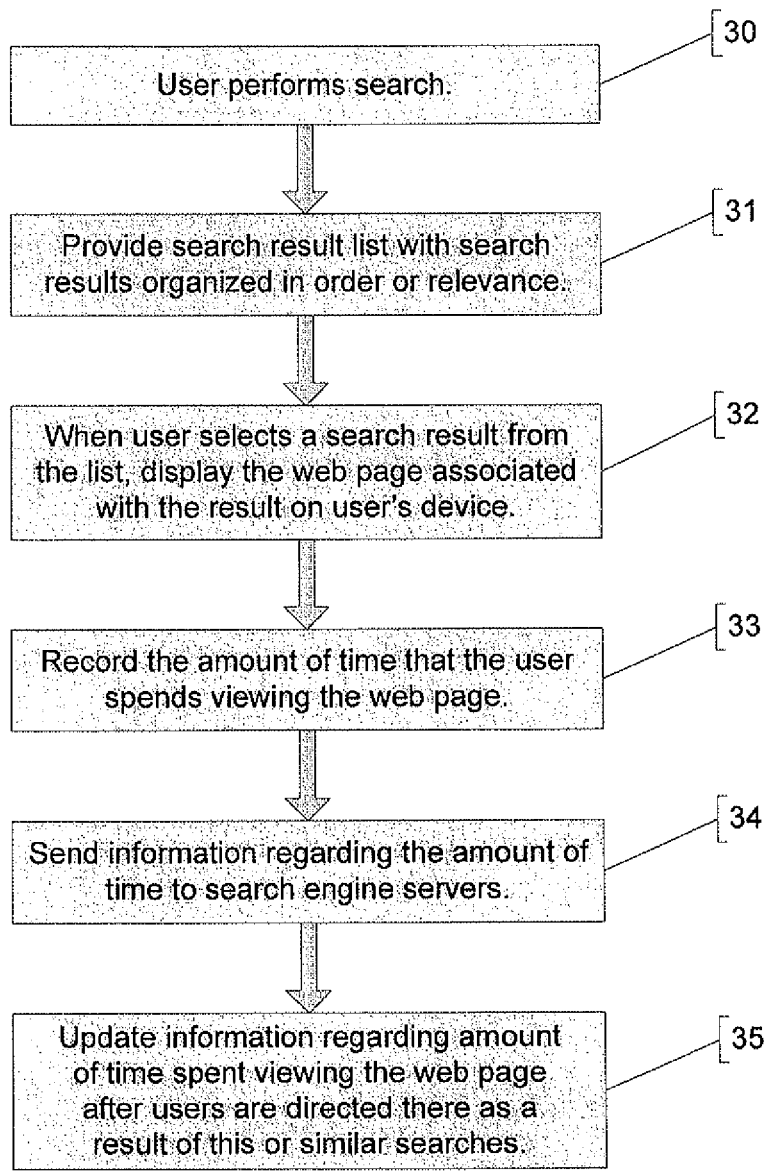
FIG. 3 is a flowchart representing a method of developing temporal information regarding lengths of time that users spend viewing web pages after being directed there by a search result.

FIG. 3 is a flowchart representing a method of building and maintaining a database that stores temporal information regarding average lengths of time that users spend viewing web pages after being directed there by a search result. At block 30, a user initiates a search by entering a search term into a search engine user interface using an internet access device. The search term can be any word, character, string of characters, or string of words. In an illustrative embodiment of the invention, the search term, or query, is transmitted over the internet to the search engine servers. At block 31, the search engine generates a search result list comprising web pages that the search engine determines to be most pertinent to the search term entered by the user. This determination can be made based on many different factors, possibly including some of the factors discussed in the Background of the Invention section above. According to an illustrative embodiment of the present invention, one of the factors used is a temporal factor that is based on the amount of time that prior searchers have viewed specific web pages after being directed there as a result of a same or similar query, as will be described in more detail below. The search engine can also rank the generated search results in the order of their respective relevance as determined by the search engine. In an illustrative embodiment of the invention, most of the steps that are performed in generating the search result list are executed at the search engine servers 24, which then transmit the search result list to the user's internet access device. The search result list is then displayed on a graphical interface on the user's device. In one implementation of the invention, the search engine servers transmit a web page containing the search result list to the user's device and this web page is displayed on the graphical interface of the user's device. In one embodiment of the invention, the search result (web page) assigned the highest relevance rating by the search engine is listed at the top of the search result list, and so on down the line. Each search result (sometimes referred to as a "search listing") illustratively comprises a descriptive title of the web page, a text excerpt from the web page that may contain the search term or terms searched for by the user, and the URL (Uniform Resource Locator), or internet address, of the web page. One or more of these items can be hyperlinked. The search listings can also include other items, such as a brief description of the web page, for example.

At block 32, when the user selects a search result from the list, the user is "taken to" that web page. That is, the web page is displayed on the user's device. In one implementation, the user can select a given search result by selecting one of the hyperlinked items in the search listing (by "clicking" on it, for example). The user may also access the web page by manually typing the web page's URL into the web browser's address bar. At block 33, after the user is taken to the web page that he/she has selected from the search result list, the length of time that the user then spends on that web page is measured. This length of time is measured starting from when the web page is first displayed on the user's device until the point in time when the user navigates away from the web page to another web page. This "navigation away" can be a navigation back to the search result list or a navigation to some different web page altogether. The time spent on the page that results from the search results can be measured in a variety of ways in accordance with the present invention: cookies, toolbars, intelligent search engines, user reporting, and website reporting are examples of some of these ways. Some of these time-tracking methods are described in more detail following the description of FIG. 3.

At block 34, the information regarding the length of time that the user spent on the web page associated with the search result listing is transmitted to the search engine servers. In an illustrative embodiment of the present invention, the search engine servers store and maintain temporal information regarding how long users typically spend on a specific web page after being directed there in response to a given search query. In various embodiments, this information can include an average, weighted average, mean, or median time, a range of times, or some combination thereof, that users spend viewing the web page after being directed there as a result of searches using the specific search term(s). Other mathematical algorithms can also be used to calculate the value that the search engine maintains for indicating how long users typically spend on a given web page after being directed there in response to the relevant query. In one embodiment of the invention, the search engine servers maintain a separate database for storing this temporal information, while in another embodiment, this temporal information is stored as part of a larger database that maintains various types of information regarding specific web pages and specific search terms.

At block 35 of FIG. 3, the search engine servers use the amount of time that was measured per block 33 and transmitted to the search engine servers per block 34, to update the information stored in the search engine database(s) regarding the typical amount of time users spend viewing the accessed web page after being directed there in response to a search using the search term(s) entered by the user per block 30. Again, this information can include an average, weighted average, mean, or median time, a range of times, some combination thereof, or any number, result, formula, or calculation that is indicative of how much time users typically spend viewing the web page. In one embodiment of the invention, the search engine also updates the temporal information corresponding to the given web page with respect to search terms that are similar, though not identical, to the search term(s) entered by the user per block 30. This updating of the temporal information can entail plugging the measured viewing time into an equation or algorithm that is used to calculate the typical viewing time value maintained in the database. In an illustrative embodiment of the invention, the length of time that was measured per block 33 and transmitted to the search engine servers per block 34 is also stored in the search engine servers for future calculations of the typical viewing time value. Also, in one embodiment of the invention, the amount of time spent on a given web page is combined with other factors and this modified temporal information is stored in, or used to update the temporal information stored in, the search engine servers. For example, the length of each text page accessed can be weighed against the length of time spent accessing the text document. If the user spent a long time accessing a text page relative to the document's length, one might presume the user read the entire document and found it useful or found what he or she had been searching for. Such a viewing would therefore be assigned a relatively higher modified temporal factor. In another example, users who spent more than, say, thirty minutes on a half-page document might be excluded from the analysis, under the presumption that they had simply walked away from their computers or did not find the document useful.

According to an illustrative embodiment of the invention, the operations described above with respect to FIG. 3 are performed iteratively in order to develop accurate and reliable information regarding how long users view specific web pages after being directed there by a given search. Thus, in one embodiment, the operations of FIG. 3 are performed every time someone performs a search, or at least every time information is provided to the search engine servers regarding length of time spent viewing a specific web page after being directed there by a given search.

As previously mentioned, the present invention contemplates multiple methods of tracking the time that a user spends on a web page after being directed there by the search engine. One of these methods involves the use of tracking cookies. In the cookies embodiment of the tracking concept, the user uses a web browser or other viewing software to access a web page. A piece of data, or "cookie," that interacts with browsing software is stored on or associated with the computer of the visiting user. This allows the search engine to monitor, actively or passively, the time spent by the user on each of the pages or entries visited. The amount of time spent on each page is stored locally on the user's computer, remotely on another computer, or in the browser itself and subsequently or periodically retrieved by the search engine to be cross-referenced against the searches performed.

Another method of tracking the time that a user spends on a web page uses a toolbar. In the toolbar embodiment, a search engine installs a toolbar or other software in the user's browser that actively monitors how much time a user spends on each page or entry accessed. This software communicates constantly or periodically with the search engine, reporting the amount of time a user spends accessing each page or entry. This allows the search engine to monitor how much time a user spends on a page or entry after conducting a search.

The present invention also contemplates search software more advanced than toolbars presently in existence. This may include intelligent search engines where part or all of the software apparatus follows the user throughout his or her journey on the Internet and in the physical world. In an illustrative embodiment of the invention, this portion of the search engine that "tags along" with the user as he/she visits different locations would be used to track how long the user spends on a given website after being directed there by a search result. Such an intelligent search engine may also include search software that uses global positioning information on the user's mobile phone and prioritizes search results for stores based upon what zip codes the user visits most often. An intelligent search engine also may include, in accordance with the present invention, search software that prioritizes search results based upon which of its suppliers a corporation has spent the most time calling on the telephone in a given month. Such intelligent search engines may also include search software that combines data as to how much time a user has spent calling on the telephone, visiting in person, visiting on the Internet, and instant messaging a certain corporation, person, location, or group. An intelligent search engine also may include, in accordance with the present invention, search engines where the software notes when a user searches for a store and then leaves his home and where the software, through global positioning and other technology, notes how much time the user is willing to invest in traveling to obtain the item searched for and correlates this to the relevance of the search result for that user or future other users.

Another method of tracking the time that a user spends on a web page involves user reporting. The invention contemplates an economic scenario wherein users keep records of how long they spend on certain sites, pages, or entries on the Internet, and where users then offer to barter or sell this data to search engines. The present invention also contemplates unpaid user reporting as a means for tracking time users spend on websites, possibly under a standardized system wherein users automatedly track how long they spend on websites after being directed there by a search engine, and immediately or periodically transmit this information to the search engine servers.

Another method of tracking the time that a user spends on a web page involves website reporting. In this embodiment, websites affirmatively report how much time was spent there by a given user after being sent there by a search result. In an "industry standard" approach, all or substantially all commercial websites actively index, archive, and report how much time was spent on the website by each user or group of users and then sell, barter, or otherwise provide this information to search providers.

To illustrate the operation of an embodiment of the invention with respect to FIG. 3, consider a user searching for web content regarding professional football player Brett Favre. Such a user might enter the search terms "Brett Favre Vikings" into the search engine user interface, per block 30. Per block 31, the search engine generates a search result list comprising web pages that the search engine determines to be most pertinent to the search terms "Brett Favre Vikings." The search engine displays a web page containing the search result list on the user's internet access device per block 31, with the search result deemed most relevant by the search engine being positioned at the top of the list. The user then selects one of the search listings from the list by, for example, clicking on a hyperlink contained in the search listing, and the corresponding web page is displayed on the user's device per block 32. Say the web page contains a story about a game Mr. Favre played as a member of the Green Bay Packers against the Minnesota Vikings. Such a user might have little or no interest in such a story and quickly navigate back to the search result page (by clicking the "back" button of his/her web browser, for example). Per block 33, the time that the user spent viewing the web page is measured in accordance with one of the measuring methods described above. The measured length of time is transmitted to the search engine servers, per block 34. The search engine servers then update the information stored therein regarding the amount of time that users spend viewing that web page after being directed to it in response to a search query using the terms "Brett Favre Vikings," per block 35. In one embodiment, the search engine servers also update the information stored therein regarding the amount of time that users spend viewing that web page after being directed to it in response to similar search queries, such as a search using the terms "Favre Minnesota Vikings." If a large percentage of users viewing this web page after being directed there in response to the "Brett Favre Vikings" query are similar to our example user, then the value maintained by the search engine as indicative of the average viewing time corresponding to this web page and the "Brett Favre Vikings" query will be relatively low.

Continuing the example of operation, after returning to the search result page, say the user selects a second search listing from the search result list and is taken to the associated web page (per block 32). Say this second web page contains a story about Favre twice soundly defeating the Green Bay Packers as a member of the Minnesota Vikings. The user might find this story to be highly relevant to what he/she was looking for, and might read the entire story, possibly multiple times, before navigating away from this second web page. The amount of time the user spent on the second web page is measured (per block 33) and transmitted to the search engine servers (per block 34), which then update the information stored therein regarding the amount of time that users spend viewing this second web page after being directed to it in response to a search query using the terms "Brett Favre Vikings" (per block 35). If a large percentage of users viewing this web page after being directed there in response to the "Brett Favre Vikings" query are similar to our example user, then the value maintained by the search engine as indicative of the average viewing time corresponding to this second web page and the "Brett Favre Vikings" query will be relatively high.

Figure 4:
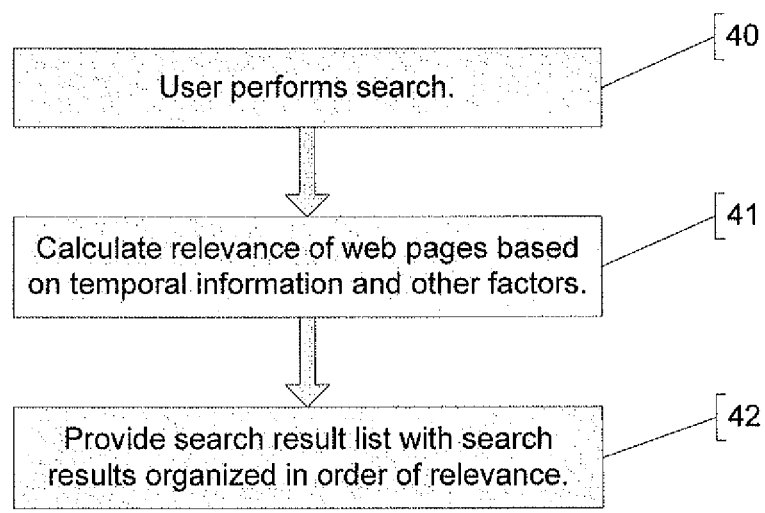
FIG. 4 is a flowchart representing a method of using temporal information, regarding lengths of time that users spend viewing web pages after being directed there by a search result, in generating a search result listing.

FIG. 4 is a flowchart representing a method of using temporal information, regarding average lengths of time that users spend viewing web pages after being directed there by a search result, in generating a search result listing. At block 40, a user initiates a search by entering a search term into a search engine user interface using an internet access device. The search term can be any word or string of words. In an illustrative embodiment of the invention, the search term, or query, is transmitted over the internet to the search engine servers. At block 41, the search engine calculates the relevance of various web pages to the received query. This calculation can be based on many different factors, possibly including some of the factors discussed in the Background of the Invention section above. According to an illustrative embodiment of the present invention, one of the factors used is a temporal factor that is based on the amount of time that prior searchers have viewed specific web pages after being directed there as a result of a same or similar query. In another embodiment of the invention, this temporal information is the sole or primary factor used to determine the relevance of various web pages to the received query. The temporal information is developed as described above with respect to FIG. 3. In an illustrative embodiment of the invention, most of the steps that are performed in calculating relevance are executed at the search engine servers 24. In one embodiment of the invention, the search engine servers maintain a separate database for storing this temporal information, while in another embodiment, this temporal information is stored as part of a larger database that maintains various types of information regarding specific web pages and specific search terms.

In one embodiment of the invention, the relevance determination 41 for a given web page is based on a combination of factors including, but not limited to, temporal information corresponding to the given web page generated per FIG. 3, the page rank of the web page, and the similarity of text items on the web page to text items included in the search query. The page rank of a web page is an importance ranking of the page that is calculated based on the number of other documents that cite to each document and the importance ranking of said citing documents, as described above in the Background of the Invention. In one embodiment of the invention, the search engine employs an equation, algorithm, vector, function, matrix or some other expression to calculate the relevance of a given web page to a given search query. According to an illustrative embodiment, the invention works as a discount coefficient. The variable, vector, function, matrix, or expression related to relevance, or another related proxy variable, is altered by a coefficient that represents the amount of time spent on a given result page or other search result. In a more complex variant of the invention, the temporal discount coefficient is determined by mathematically comparing (in a ratio or an expression) the amount of information on a given web page to the amount of time spent on the page. In other words, the amount of time it would take a user to appreciate all of the information on a given result is estimated and then the time spent looking at the result is interpreted as a fraction of the estimated time required to appreciate all information within that result. The weighing of the amount of time the user spends on the page that results from his search is a central principle of the invention and this includes other mathematical methods for including a discount (or premium) in a search calculation related to how much time is spent viewing a result from a search. In general, where users invest more time in a specific result rather than other results, the search engine will prioritize that result as more relevant for subsequent similar searches.

At block 42, the search engine generates a search result list comprising web pages that the search engine determines to be most pertinent to the search term entered by the user. The search result list is then displayed on a graphical interface on the user's device. In one implementation of the invention, the search engine servers transmit a web page containing the search result list to the user's device and this web page is displayed on the graphical interface of the user's device. In one embodiment of the invention, the search engine ranks the generated search results in the order of their respective relevance as determined by the search engine. The search result (web page) assigned the highest relevance rating by the search engine is listed at the top of the search result list, and so on down the line.

To illustrate the operation of an embodiment of the invention with respect to FIG. 4, and to continue with the example of operation used above to illustrate the operations of FIG. 3, consider a second hypothetical searcher who is also a Brett Favre fan. This user initiates a search by entering "Brett Favre Vikings" into a search engine user interface, per block 40. This search query is transmitted over the internet to the search engine servers. Per block 41, the search engine calculates the relevance of various web pages to the "Brett Favre Vikings" query. One of the factors used in this calculation is a temporal factor that is based on the amount of time that prior searchers have viewed specific web pages after being directed there as a result of the "Brett Favre Vikings" query or some similar query. This temporal information was developed as described above with respect to FIG. 3. Recall that in the example of operation presented above with respect to FIG. 3, the user in that example spent very little time viewing a hypothetical web page that contained a story about some game Mr. Favre played as a member of the Green Bay Packers against the Minnesota Vikings. If a high percentage of searchers have viewing habits similar to that user, the temporal factor applied by the search engine will weigh towards this first web page being assigned a relatively lower relevance. Recall also that the same hypothetical user spent a great deal of time perusing a second web page that contained a story about Favre twice soundly defeating the Green Bay Packers as a member of the Minnesota Vikings. If a high percentage of searchers have viewing habits similar to this user, the temporal factor applied by the search engine will weigh towards this second web page being assigned a relatively higher relevance. Thus if the temporal factor were the sole factor used by the search engine in determining relevance, this second web page would be assigned a higher relevance ranking than the first one. But the relevance determination of block 41 can be based on a combination of factors that might also include, for example, the page rank of the web page, and the similarity of text items on the web page to text items included in the search query. Using these and/or other factors, the search engine calculates a relevance ranking for all relevant web pages relative to the "Brett Favre Vikings" query and generates a search result list comprising web pages that the search engine determines to be most pertinent to the query and displays the listing on the user's device, per block 42.

Figure 5:
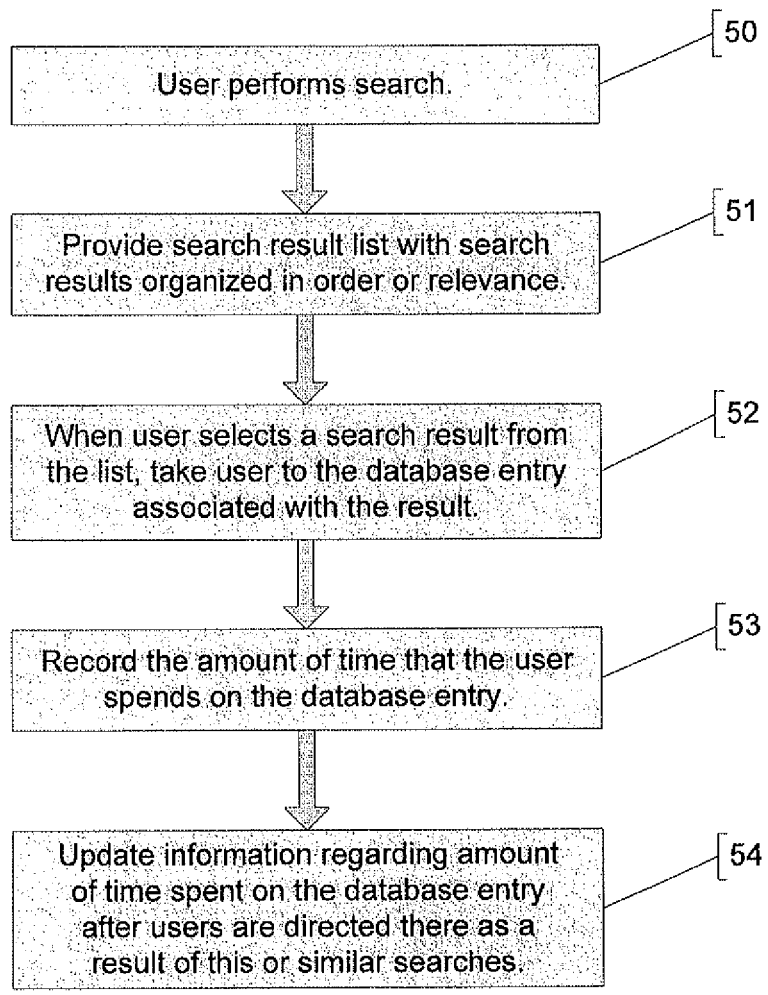
FIG. 5 is a flowchart representing a method of developing temporal information regarding lengths of time that users spend viewing database entries after being directed there by a search result.

An alternative embodiment of the present invention pertains to database searching. In this embodiment, the length of time that a user spends on a given database entry after being directed to that entry by a database search is used as an indicator of relevance in subsequent searches for the same or similar search term(s). FIG. 5 is a flowchart representing a method of developing temporal information regarding average lengths of time that users spend interacting with database entries after being directed there by a search result. At block 50, a user initiates a search by entering a search term into a search engine user interface using any kind of device that is capable of accessing a database. The search term can be any word, character, string of characters, or string of words. At block 51, the search engine generates a search result list comprising database entries that the search engine determines to be most pertinent to the search term(s) entered by the user. This determination can be made based on many different factors. According to an illustrative embodiment of the present invention, one of the factors used is a temporal factor that is based on the amount of time that prior searchers have spent on specific database entries after being directed there as a result of a same or similar query, as will be described in more detail below. The search engine can also rank the generated search results in the order of their respective relevance as determined by the search engine. The search result list is displayed on a graphical interface on the user's device. In one embodiment of the invention, the search result (database entry) assigned the highest relevance rating by the search engine is listed at the top of the search result list, and so on down the line.

At block 52, when the user selects a search result from the list (by clicking on it, for example), the user is "taken to" that database entry. In one embodiment of the invention, taking the user to the selected database entry comprises displaying the selected database entry on the user's device. At block 53, after the user is taken to the database entry that he/she has selected from the search result list, the length of time that the user then spends on that database entry is measured. This length of time is measured starting from when the user first accesses the database entry until the point in time when the user navigates away from the database entry. This "navigation away" can be a navigation back to the search result list, or a navigation to some different database entry, or it could be a closing of the database program altogether. The time spent on the database entry that results from the search results can be measured automatedly, using software and/or hardware, in a variety of ways in accordance with the present invention. One embodiment of the invention uses database software that employs a search toolbar. When a user searches the database for an entry and quickly passes over the first several resulting cells or entries but then stays within and edits a subsequent entry in the database, the search function within the database may prioritize that entry as more relevant for subsequent similar searches by that user or other users.

In an illustrative embodiment of the present invention, the search engine functionality of the database stores and maintains temporal information regarding how long users typically spend on a specific database entry after being directed there in response to a given search query. In various embodiments, this information can include an average, weighted average, mean, or median time, a range of times, or some combination thereof, that users spend viewing the database entry after being directed there as a result of searches using the specific search term(s). Other mathematical algorithms can also be used to calculate the value that the search engine maintains for indicating how long users typically spend on a given database entry after being directed there in response to the relevant query. In one embodiment of the invention, in addition to maintaining the temporal information as just described, the search engine functionality also maintains various other types of information regarding specific database entries and specific search terms, and the relevance of the database entries relative to the search terms.

At block 54 of FIG. 5, the search functionality of the database software uses the amount of time that was measured per block 53 to update the information regarding the average amount of time users spend viewing the accessed database entry after being directed there in response to a search using the search term(s) entered by the user per block 50. Again, this information can include an average, weighted average, mean, or median time, a range of times, some combination thereof, or any number, result, formula, or calculation that is indicative of how much time users typically spend viewing the database entry. In one embodiment of the invention, the search engine also updates the temporal information corresponding to the given database entry with respect to search terms that are similar, though not identical, to the search term(s) entered by the user per block 50. This updating of the temporal information can entail plugging the measured viewing time into an equation or algorithm that is used to calculate the typical viewing time value maintained by the database search engine. In an illustrative embodiment of the invention, the length of time that was measured per block 53 is also stored by the search functionality of the database for future calculations of the typical viewing time value. Also, in one embodiment of the invention, the amount of time spent on a given database entry is combined with other factors and this modified temporal information is stored by, or used to update the temporal information stored by, the database search engine.

According to an illustrative embodiment of the invention, the operations described above with respect to FIG. 5 are performed iteratively in order to develop accurate and reliable information regarding how long users view specific database entries after being directed there by a given search. Thus, in one embodiment, the operations of FIG. 5 are performed every time someone performs a search.

Figure 6:
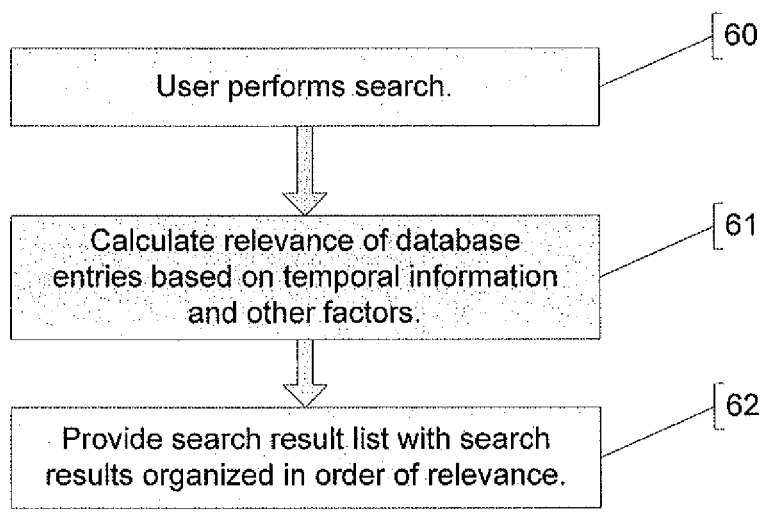
FIG. 6 is a flowchart representing a method of using temporal information, regarding lengths of time that users spend viewing database entries after being directed there by a search result, in generating a search result listing.

FIG. 6 is a flowchart representing a method of using temporal information, regarding average lengths of time that users spend viewing database entries after being directed there by a search result, in generating a search result listing. At block 60, a user initiates a search by entering a search term into a search engine user interface. The search term can be any word, character, string of words, or string of characters. At block 61, the search engine calculates the relevance of various database entries to the received query. This calculation can be based on many different factors. According to an illustrative embodiment of the present invention, one of the factors used is a temporal factor that is based on the amount of time that prior searchers have viewed specific database entries after being directed there as a result of a same or similar query. In another embodiment of the invention, this temporal information is the sole or primary factor used to determine the relevance of various database entries to the received query. The temporal information is developed as described above with respect to FIG. 5. In one embodiment of the invention, in addition to maintaining this temporal information as just described, the search engine functionality also maintains various other types of information regarding specific database entries and specific search terms, and the relevance of the database entries relative to the search terms.

The relevance determination 61 for a given database entry can be based on a combination of factors including, but not limited to, temporal information corresponding to the given database entry generated per FIG. 5 and the degree of similarity of items in the database entry to items included in the search query. In one embodiment of the invention, the search engine employs an equation, algorithm, vector, function, matrix or some other expression to calculate the relevance of a given database entry to a given search query. According to an illustrative embodiment, the invention works as a discount coefficient. The variable, vector, function, matrix, or expression related to relevance, or another related proxy variable, is altered by a coefficient that represents the amount of time spent on a given result entry. In a more complex variant of the invention, the temporal discount coefficient is determined by mathematically comparing (in a ratio or an expression) the amount of information in a given database entry to the amount of time spent on the entry. In other words, the amount of time it would take a user to appreciate all of the information in a given result is estimated and then the time spent looking at the result is interpreted as a fraction of the estimated time required to appreciate all information within that result. The weighing of the amount of time the user spends on the entry that results from his search is a central principle of the invention and this includes other mathematical methods for including a discount (or premium) in a search calculation related to how much time is spent viewing a result from a search. In general, where users invest more time in a specific result rather than other results, the search engine will prioritize that result as more relevant for subsequent similar searches.

At block 62, the search engine generates a search result list comprising database entries that the search engine determines to be most pertinent to the search term entered by the user. The search result list is then displayed on a graphical interface on the user's device. In one embodiment of the invention, the search engine ranks the generated search results in the order of their respective relevance as determined by the search engine. The search result (database entry) assigned the highest relevance rating by the search engine is listed at the top of the search result list, and so on down the line.

Figure 7:
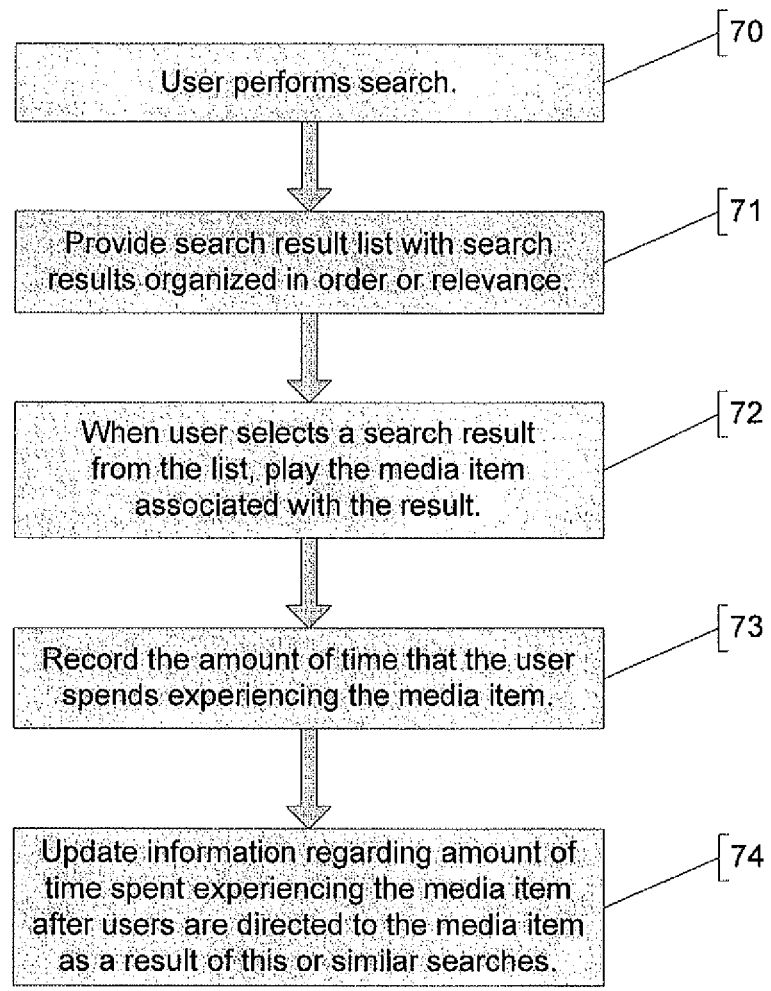
FIG. 7 is a flowchart representing a method of developing temporal information regarding lengths of time that users spend experiencing media files after being directed there by a search result.

An alternative embodiment of the present invention pertains to searching for media files, whether it be online, in a database environment, or otherwise. Such media files can comprise audio (e.g., music) files, video files, image files, or any other type of media files. In this embodiment, the length of time that a user spends experiencing (i.e., viewing, listening to, interacting with, etc.) a given media item after being directed to that media item by a search is used as an indicator of relevance in subsequent searches for the same or similar media item(s). FIG. 7 is a flowchart representing a method of developing temporal information regarding average lengths of time that users spend experiencing media items after being directed to them by a search result. At block 70, a user initiates a search by entering a search term into a search engine user interface using any type of user device that has media playing/displaying capabilities. The search term can be any word, character, string of characters, or string of words. At block 71, the search engine generates a search result list comprising media files that the search engine determines to be most pertinent to the search term(s) entered by the user. This determination can be made based on many different factors. According to an illustrative embodiment of the present invention, one of the factors used is a temporal factor that is based on the amount of time that prior searchers have spent experiencing specific media files after being directed to them as a result of a same or similar query, as will be described in more detail below. The search engine can also rank the generated search results in the order of their respective relevance as determined by the search engine. The search result list is displayed on a graphical interface on the user's device. In one embodiment of the invention, the search result (media file) assigned the highest relevance rating by the search engine is listed at the top of the search result list, and so on down the line.

At block 72, when the user selects a search result from the list (by clicking on the file name, for example), the associated media item is played or otherwise presented, depending on what kind of media it is. At block 73, the length of time that the user then spends experiencing (listening to, for example) the media item is measured. This length of time is measured starting from when the media item begins playing (or is otherwise presented) until the point in time when the user terminates the playing of the media item. The time spent experiencing the media item that results from the search results can be measured automatedly, using software and/or hardware, in a variety of ways in accordance with the present invention.

In an illustrative embodiment of the present invention, the search engine stores and maintains temporal information regarding how long users typically spend experiencing a specific media item after being directed to the file in response to a given search query. In various embodiments, this information can include an average, weighted average, mean, or median time, a range of times, or some combination thereof, that users spend experiencing the media file after being directed to it as a result of searches using the specific search term(s). Other mathematical algorithms can also be used to calculate the value that the search engine maintains for indicating how long users typically spend on a given media item after being directed to it in response to the relevant query. In one embodiment of the invention, in addition to maintaining the temporal information as just described, the search engine also maintains various other types of information regarding specific media files and specific search terms, and the relevance of the media files relative to the search terms.

At block 74 of FIG. 7, the search engine uses the amount of time that was measured per block 73 to update the information regarding the average amount of time users spend experiencing the selected media item after being directed to the file in response to a search using the search term(s) entered by the user per block 70. Again, this information can include an average, weighted average, mean, or median time, a range of times, some combination thereof, or any number, result, formula, or calculation that is indicative of how much time users typically spend experiencing the media item. In one embodiment of the invention, the search engine also updates the temporal information corresponding to the given media file with respect to search terms that are similar, though not identical, to the search term(s) entered by the user per block 70. This updating of the temporal information can entail plugging the measured playing time into an equation or algorithm that is used to calculate the typical playing time value maintained by the search engine. In an illustrative embodiment of the invention, the length of time that was measured per block 73 is also stored by the search functionality for future calculations of the typical playing time value. Also, in one embodiment of the invention, the amount of time that a given media file is played is combined with other factors and this modified temporal information is stored by, or used to update the temporal information stored by, the search engine.

According to an illustrative embodiment of the invention, the operations described above with respect to FIG. 7 are performed iteratively in order to develop accurate and reliable information regarding how long users play specific media files after being directed to them by a given search. Thus, in one embodiment, the operations of FIG. 7 are performed every time someone performs a search for a media file.

Figure 8:
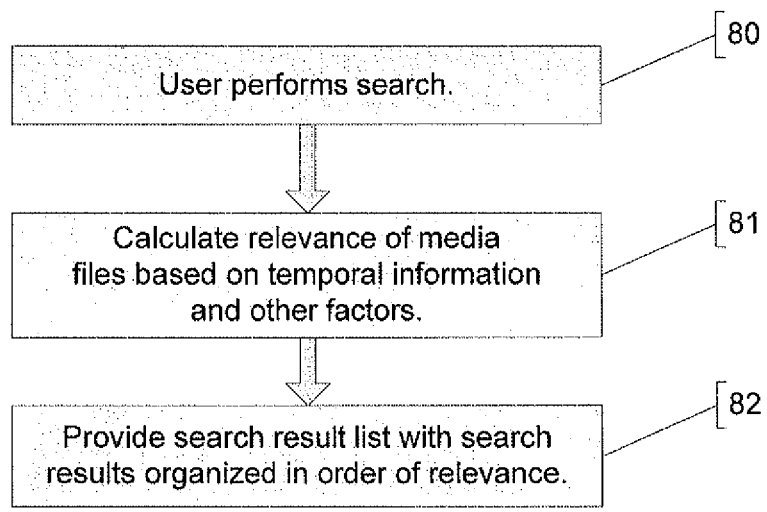
FIG. 8 is a flowchart representing a method of using temporal information, regarding lengths of time that users spend experiencing media files after being directed there by a search result, in generating a search result listing.

FIG. 8 is a flowchart representing a method of using temporal information, regarding average lengths of time that users spend experiencing media items after being directed them by a search result, in generating a search result listing. At block 80, a user initiates a search by entering a search term into a search engine user interface using any device that has media capabilities. The search term can be any word, character, string of words, or string of characters. At block 81, the search engine calculates the relevance of various media files to the received query. This calculation can be based on many different factors. According to an illustrative embodiment of the present invention, one of the factors used is a temporal factor that is based on the amount of time that prior searchers have spent experiencing specific media, files after being directed there as a result of a same or similar query. Thus if a user searching for audio files skips or stops an audio track search result after only a few seconds while listening to another audio track search result for the entire five-minute duration, the search engine uses the comparatively longer listening duration as to the second audio track as an indicator of its greater relevance to the user's prior search. In one embodiment of the invention, this temporal information is the sole or primary factor used to determine the relevance of various media files to the received query, while in another embodiment it is just one of a plurality of factors used to determine relevance. The temporal information is developed as described above with respect to FIG. 7. In one embodiment of the invention, in addition to maintaining this temporal information as just described, the search engine functionality also maintains various other types of information regarding specific media files and specific search terms, and the relevance of the media files relative to the search terms.

The relevance determination 81 for a given media file can be based on a combination of factors including, but not limited to, temporal information corresponding to the given media item generated per FIG. 7 and the degree of similarity of terms in the name of the media file to terms included in the search query. In one embodiment of the invention, the search engine employs an equation, algorithm, vector, function, matrix or some other expression to calculate the relevance of a given media file to a given search query. According to an illustrative embodiment, the invention works as a discount coefficient. The variable, vector, function, matrix, or expression related to relevance, or another related proxy variable, is altered by a coefficient that represents the amount of time spent on a given result file. In a more complex variant of the invention, the temporal discount coefficient is determined by mathematically comparing (in a ratio or an expression) the total playing length of a media file to the amount of time the media file is actually played. The weighing of the amount of time the user spends experiencing the media file that results from his search is a central principle of the invention and this includes other mathematical methods for including a discount (or premium) in a search calculation related to how much time is spent experiencing a media file from a search. In general, where users invest more time in a specific result rather than other results, the search engine will prioritize that result as more relevant for subsequent similar searches.

At block 82, the search engine generates a search result list comprising media files that the search engine determines to be most pertinent to the search term entered by the user. The search result list is then displayed on a graphical interface on the user's device. In one embodiment of the invention, the search engine ranks the generated search results in the order of their respective relevance as determined by the search engine. The search result (media file) assigned the highest relevance rating by the search engine is listed at the top of the search result list, and so on down the line.

Although a preferred embodiment of the present invention has been described, it should not be construed to limit the scope of the appended claims. Those skilled in the art will understand that various modifications may be made to the described embodiment. Moreover, to those skilled in the various arts, the invention itself herein will suggest solutions to other tasks and adaptations for other applications. It is therefore desired that the present embodiments be considered in all respects as illustrative and not restrictive, reference being made to the appended claims rather than the foregoing description to indicate the scope of the invention.

What is claimed is:

1. A computer-implemented method of processing a search result generated by an automated search for audio files, comprising:
   determining a length of time spent by a user listening to an audio file associated with a search result;
   comparing the length of time spent by the user listening to the audio file against a total playing length of the audio file to determine a listening ratio; and
   determining a search result ranking for a second, separate, search based at least in part on said listening ratio.

2. The method of claim 1 wherein said determining a length of time spent by a user listening to an audio file associated with a search result comprises measuring a length of time spent by a user listening to an audio file associated with a search result.

3. The method of claim 1 further comprising the following operations performed prior to said determining a length of time spent by a user listening to an audio file associated with a search result:
   receiving a search query from a user;
   providing a search result listing in response to said query; and
   causing an audio file to be played on a user device in response to a selection by the user from said search result listing.

4. The method of claim 1 further comprising using said listening ratio to update information pertaining to a typical length of time users spend listening to said audio file after being directed to it in response to a same or similar search, and wherein the processing operation comprises processing a result of a second, separate, search based at least in part on said information pertaining to a typical length of time.

5. The method of claim 1 wherein said determining a search result ranking for a second, separate, search based at least in part on said listening ratio comprises determining a search result ranking for a subsequent search performed by a second user based at least in part on said listening ratio.

6. The method of claim 4 wherein said information pertaining to a typical length of time users spend listening to said audio file after being directed to it in response to a same or similar search comprises an average length of time users spend listening to said audio file after being directed to it in response to a same or similar search.

7. The method of claim 4 further comprising storing the determined length of time in memory for future calculations of the information pertaining to a typical length of time users spend listening to said audio file after being directed to it in response to a same or similar search.

8. A computer-implemented method of processing a search result generated by an automated search for video files, comprising:
   determining a length of time spent by a user viewing a video file associated with a search result;
   comparing the length of time spent by the user viewing the video file against a total playing length of the video file to determine a viewing ratio; and
   determining a search result ranking for a second, separate, search based at least in part on said viewing ratio.

9. The method of claim 8 wherein said determining a search result ranking for a second, separate, search based at least in part on said viewing ratio comprises determining a search result ranking for a subsequent search performed by a second user based at least in part on said viewing ratio.

10. The method of claim 8 wherein said determining a length of time spent by a user listening to an audio file associated with a search result comprises measuring a length of time spent by a user viewing a video file associated with a search result.

11. The method of claim 8, further comprising the following operations performed prior to said determining a length of time spent by a user listening to an audio file associated with a search result:
    receiving a search query from a user;
    providing a search result listing in response to said query; and
    causing a video file to be played on a user device in response to a selection by the user from said search result listing.

12. The method of claim 8, further comprising using said viewing ratio to update information pertaining to a typical length of time users spend viewing said video file after being directed to it in response to a same or similar search, and wherein said determining a search result ranking for a second, separate, search comprises determining a search result ranking for a second, separate, search based at least in part on said information pertaining to a typical length of time.

13. The method of claim 12 wherein said information pertaining to a typical length of time users spend viewing said video file after being directed to it in response to a same or similar search comprises an average length of time users spend viewing said video file after being directed to it in response to a same or similar search.

14. The method of claim 12 further comprising storing the determined length of time in memory for future calculations of the information pertaining to a typical length of time users spend viewing said video file after being directed to it in response to a same or similar search.

15. A computer-implemented method of processing search engine search results, comprising:
    determining a length of time spent by a user on a web page associated with a search result;
    comparing the length of time spent by the user on the web page with a predetermined threshold length of time;
    in response to the length of time spent by the user on the web page being less than or equal to the predetermined threshold length of time, using said length of time to update information pertaining to a typical length of time users spend on the web page after being directed there in response to a same or similar search; and determining a search result ranking for a second, separate, search based at least in part on said information pertaining to a typical length of time.

16. The method of claim 15, wherein if the length of time spent by the user on the web page is greater than the predetermined threshold length of time, said length of time is not used to update the information pertaining to a typical length of time users spend on said web page after being directed there in response to a same or similar search.

\* \* \* \* \*